Figure 1:
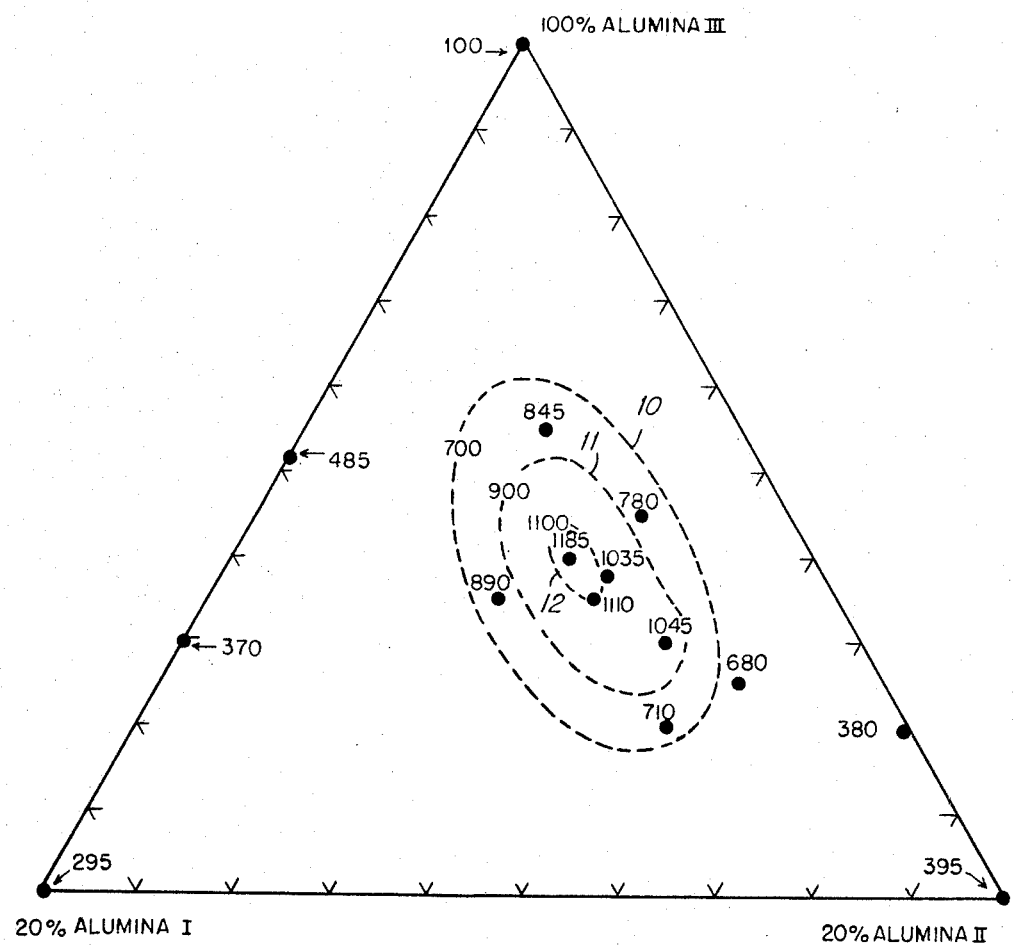

United States Patent Office 3,274,008
Patented Sept. 20, 1966

3,274,008
REFRACTORY COMPOSITIONS AND METHODS
OF PREPARATION
Victor A. Braunwarth, Alexander Gordon Nickle, and Norman W. F. Phillips, Arvida, Quebec, Canada, assignors to Aluminium Laboratories Limited, Montreal, Quebec, Canada, a corporation of the Dominion of Canada
Filed Dec. 23, 1963, Ser. No. 332,546
20 Claims. (Cl. 106—65)

This invention relates to refractory compositions. More particularly, it is directed to alumina-containing refractories suitable for use as refractory cements or mortars, and to procedures for preparing the same.

In the construction of certain types of equipment, such as converters and the like for use in the so-called subhalide distillation process for producing aluminum metal, it is desirable to employ alumina refractory linings of very high purity, e.g. having an alumina content above 99%. Although suitable refractory brick containing more than 99% alumina is commercially available, the provision of a satisfactory cement or mortar of corresponding purity for use in laying such brick has heretofore presented considerable difficulty. Lower-purity cements, such as those made with a binder of calcium aluminate or aluminum phosphate, tend to decompose under certain conditions and may contribute impurities to the process being carried out in the equipment or may become weak.

It has been proposed to prepare for some purposes cements comprising a body of more or less finely divided alumina (of particle size ranging from above 1 micron upwards e.g. to about 150 mesh size), with an aluminum salt, e.g. aluminum chlorhydrate, in aqueous solution as a binder. It has indeed now been found that with the use of salts such as the above, or aluminum sulfate, or aluminum chloride (which salts decompose upon firing to yield alumina and volatile compounds) fired cements can be achieved having a purity above 99%, the volatile compounds of the binder salts being driven off during the firing operation. However, the bonding strentgh of such cements with alumina as specified above is undesirably low unless they are subjected to inconveniently high temperatures to develop a ceramic bond. Another suggested cement composition, incorporating a solution of aluminum phosphate as a binder with the aforementioned body of finely divided alumina, attains adequate bonding strength at relatively low firing temperatures, but the phosphate leaves a contaminant residue upon firing which reduces the purity of the fired cement to a value substantially below the desired minimum 99% alumina content.

The present invention embraces a novel class of refractory compositions comprising, with an aqueous solution of an aluminum salt as a binder, a body of refractory particles which incorporates certain specific particle size fractions, as hereinafter more fully described. In an important aspect, the invention is particularly directed to cement compositions wherein the particulate refractory body consists essentially of alumina particles throughout, including alumina particles in the latter particle size fractions. Referring by way of illustration to such alumina cements, it has been found that whatever aluminum salt is used as a binder, the inclusion of the specified particle fractions in the body of particulate alumina results in attainment of a significantly improved bonding strength at a given firing temperature, as compared with the bonding strength attained at the same temperature by a composition having the same salt solution as binder, but incorporating only a conventional body of alumina particles, i.e. as mentioned above. It has further been found that the combination of the present alumina particle size fractions with certain aluminum salt binders in alumina cement compositions provides high-fired-purity refractory cements (above 99% alumina content) which attain very high bonding strengths at advantageously low firing temperatures, as desired for the purposes previously mentioned. The invention in one specific sense is particularly directed to these latter cements.

The body of alumina particles incorporated in the alumina cement compositions of the present invention may be generally characterized as comprising a content of alumina particles smaller than 325 mesh size on the Tyler scale (the standard U.S. scale), whereof an effective minor proportion are alumina particles of colloidal or submicron dimension, i.e. less than 1 micron in size, and a major proportion are particles between about 1 and about 44 microns in size (the latter value corresponding to 325 mesh size). It is to be understood that the terms "minor" and "major" proportions or fractions, as used herein, refer to proportions of fractions respectively less than and greater than 50% by weight.

Such body of alumina particles either may consist substantially entirely of these −325 mesh size particles or may also include a content of larger particles ranging up to above 65 mesh size (the usual upper limit of particle size in refractory cement compositions) or even somewhat above the latter value; in either event, the proportion of submicron particles included is such as to constitute at least about 1% of the total particulate body and at least about 2% of the −325 mesh size particle content. In contrast, the bodies of particulate alumina previously proposed for alumina cements and referred to above contain no more than negligible quantities of submicron particles.

Submicron alumina particles suitable for use in the present compositions may be prepared by any convenient procedure yielding high-purity particulate alumina of the requisite particle size. A variety of such procedures, ordinarily involving direct condensation of the particles from the gaseous phase, are known in the art. For example, submicron alumina particles may be obtained by burning aluminum metal; by high-temperature hydrolysis of gaseous aluminum trichloride with water vapor; by condensation of alumina vapor derived by evaporation of alumina; by collecting the fume which is a by-product of the thermal reduction of aluminous ores in an electric furnace; or by burning aluminum monochloride in air. It will be appreciated that the foregoing procedures are mentioned only by way of illustration, various other methods of preparing submicron alumina also being known.

As stated, the present invention contemplates alumina cement mixtures comprising a body of alumina particles including the abovedescribed submicron and other particle size fractions and an aqueous aluminium salt solution. In a typical instance of use of such mixtures, the cement in as-mixed, unfired condition is applied as a mortar in laying refractory brick, and is then fired (subjected to heat) in situ; this heating step causes the salt solution to decompose or pyrolyze, yielding an aluminous residue which constitutes the binder of the fired cement. Thus the procedure of the invention broadly includes the steps of establishing the mixture of cement ingredients (preferably by first mixing the submicron particles with the salt solution and then adding successively larger particle-size fractions) and heating the mixture to pyrolyze the salt. The resultant cement, being the fired cement product of the invention, accordingly comprises the aforementioned body of particles with the aluminous binder produced by pyrolysis of the salt solution.

The advantageous properties of the present cement compositions are believed attributable to the presence of the submicron alumina particles in admixture with the larger-size −325 mesh particles and with the aluminum salt binder. That is to say, inclusion of the submicron-size particles with the other cement constituents is found to result in strong cements, which attain high bonding strengths (as compared with cements of like composition but lacking the submicron particle fraction) at relatively low firing temperatures and maintain such high strength at high temperatures. In general, it is found that inclusion of as little as 2% submicron alumina (based on the amount of −325 mesh alumina present) is effective to provide significantly improved bonding strength, and that larger minor proportions of submicron alumina provide still further improvement in bonding strength. A presently preferred, special range of proportions of submicron alumina in the compositions of the invention is between about 5% (or very advantageously 10%) and about 25% or more, e.g. in some cases even up to about 40%, of the total −325 mesh alumina present.

It is also preferred that the submicron constituent of the cement incorporate two fractions of respectively different submicron particle size ranges (or that the submicron particles be graded in particle size over a range of submicron dimensions), such two-fraction or graded constituent having been found especially effective to provide the advantageous properties attained with the invention. In this connection, it is desirable to include as one of the two submicron fractions a proportion of particles less than about 0.05 micron in particle size, with the other submicron fraction comprising particles of larger size (below the 1 micron upper limit). Indeed, in a preferred and very effective embodiment of the invention, the latter fraction is in a particle size range below about 0.2 micron.

The bonding strength achieved at a given firing temperature by any given cement composition according to the invention is dependent on a number of factors, including the size ranges of the several particle fractions, the relative proportions of each fraction present in the composition, the bulk density (mass per unit volume including volume of both open and closed pores) of the particles, and the specific aluminum salt employed to provide the binder. Thus, in particular, the specific range of proportions of submicron alumina particles providing optimum bonding strength for a given cement composition is dependent on the size characteristics of the submicron particles themselves and on the bulk density of the particles larger than 1 micron.

In this connection, it is presently believed that the unusual advantages realized with the compositions of the present invention may be explained by the consideration that the body of particulate alumina employed incorporates particle fractions, including the submicron fraction or fractions, so sized and proportioned that each finer fraction fits into the interstices of the coarser fractions. When the composition, i.e. containing an aluminum salt binder, is fired, the decomposing binder salt produces aluminous particles in situ which serve to hold the mass together. These latter particles, being produced from material originally in solution, are presumably of sub-colloidal dimension, being apparently a particle size fraction still finer than the submicron constituent of the starting cement mixture; they are believed to fill the interstices of the submicron particle fraction (and any unfilled openings in and between the larger particles) so as to leave very few holes or openings in the fired cement.

Accordingly, the proportion of submicron alumina providing optimum bonding strength for any given cement composition is believed to be that proportion which is sufficient substantially entirely to fill the interstices (including open pores) of the content of larger (+1 micron) −325 mesh size particles present in the composition; this optimum proportion of submicron particles is relatively small when the +1 micron particles have high bulk density (i.e. few open pores) and greater when the bulk density of the latter particles is lower. Thus, in general, cement bonding strength increases with increasing proportion of submicron particles until the aforementioned optimum proportion is reached, i.e. until the proportion of submicron alumina is such as to fill completely the pores and interstices of the larger −325 mesh size particles. At the same time, since the latter particles are individually stronger than equivalent amounts of submicron alumina, it is preferable that the proportion of submicron alumina be no greater than that necessary to fill the pores and interstices of such larger particles.

With the above-described −325 mesh size particle content (including the submicron alumina particles) there may be incorporated, as stated above, a content of larger particles, ranging e.g. between about 325 mesh and about 65 mesh in size. These coarser particles, being inherently stronger than the plastic phase comprising the −325 mesh size particles and the binder solution, provide additional strength for the cement. In cements including such +325 mesh particle size fraction, the −325 mesh fraction preferably constitutes at least about 25% of the total body of particles.

While the invention results in compositions of improved bonding strength at given firing temperatures with a wide variety of water-soluble aluminum salt binders that pyrolyze (when heated in aqueous solution) to produce aluminous binder residues, and thus broadly embraces compositions including such binders as aqueous solutions of aluminum phosphate, particularly important advantages of the invention reside in the provision of high purity alumina refractories (containing upwards of 99% alumina) which attain high bonding strengths at desirably low firing temperatures, as mentioned above. It is accordingly preferred to use as the binder in the present compositions a water-soluble aluminum salt which decomposes upon firing to yield alumina and volatile compounds driven off during the firing operation. A number of such salts are known, including e.g. aluminum nitrate, aluminum sulfate, aluminum chlorohydrate, and aluminum chloride.

As to these latter salts, it is found that the bonding strength attained is significantly dependent on the particular salt employed. In this regard, it is presently preferred to use as the binder a solution of aluminum sulfate, aluminum chlorohydrate, or aluminum chloride, the latter two salts being especially preferred in that they provide particularly high bonding strength. That is to say, each of these two latter salts is found to coact in a particularly effective way with the aforementioned body of alumina particles to yield high fired purity alumina cement attaining an extraordinarily high bonding strength at low firing temperatures. Accordingly, the present invention in a specific aspect is directed to compositions including one of the latter salts as binder.

The alumina cement compositions described above have, as stated, particular advantages for use directly in the form of cement, e.g. as a mortar for laying alumina brick or other refractory bodies. They may, however, also be admixed before firing with aggregates of alumina or other refractory particles coarser than 65 mesh size to provide other types of refractory compositions, e.g. castable refractories, which again have the advantages of high bonding strengths attained at relatively low firing temperatures due to the presence of the submicron alumina in the cement. Thus the invention further embraces refractory compositions comprising aggregates of +65 mesh size refractory particles adhered together by the above-described cements. In compositions of the latter type the preferred minimum proportion of −325 mesh particles in the total body of particles, including +65 mesh particles, depends on the nature of the +65 mesh aggregate and particularly on the upper size limit of particles comprising this aggregate, which in turn is selected with regard to the thickness of section of the refractory body to be formed. The theoretical considerations previously set out, i.e. with respect to the provision of the particles in graded sizes and proportions effective to substantially fill the interstices of each larger particle size fraction, for attainment of optimum bonding strengths, are believed applicable to these compositions including +65 mesh particles as well as to the cements previously discussed.

It is to be understood that the foregoing alumina cements are particular examples of the refractory compositions of the invention. In a broad sense, the invention also contemplates refractory cements and other compositions of the type described above (i.e. having a content of −325 mesh refractory particles including a minor proportion of submicron alumina particles and a binder provided by an aqueous aluminum salt solution), wherein some or all of the refractory particles larger than 1 micron are constituted of low-purity alumina refractories or refractories other than alumina. In these latter compositions, again, the inclusion of submicron alumina particles affords superior bonding strength at comparatively low firing temperatures. The considerations set forth above with respect to particle size ranges and proportions are applicable to these compositions as well as to the high-purity alumina cements.

Figure 2:
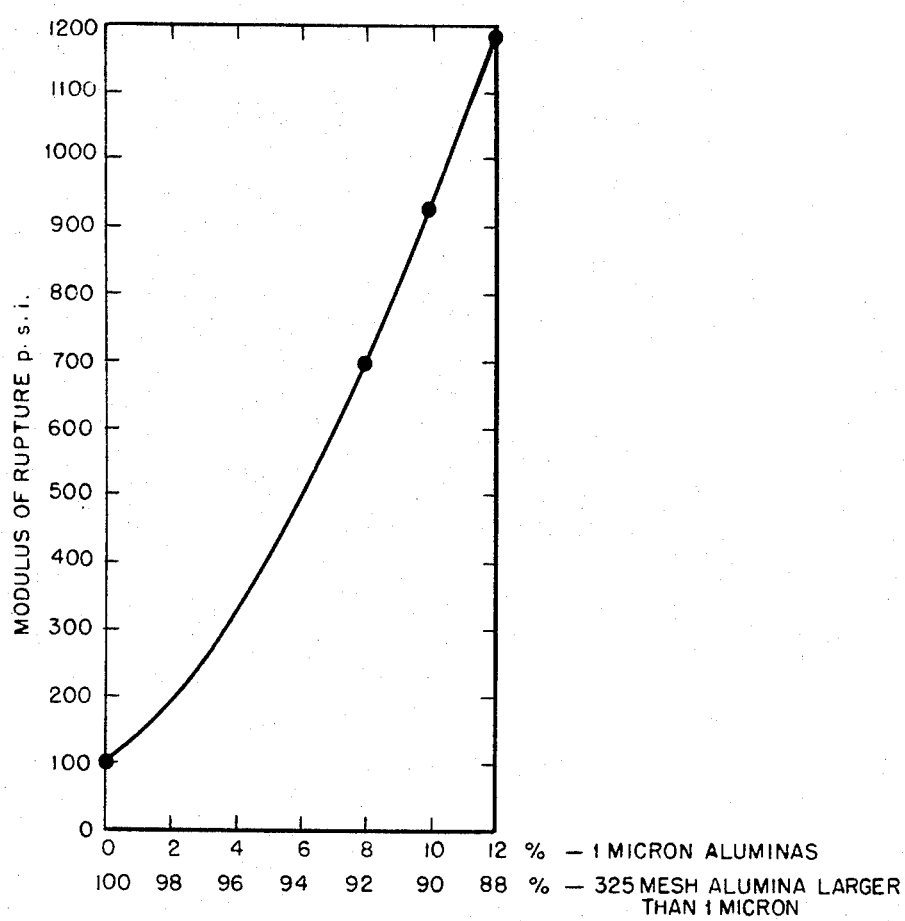

Further features and advantages of the invention will be apparent from the detailed description hereinbelow set forth (in which reference is made to certain particular submicron particle size fractions exemplifying particularly effective embodiments of the invention), together with the accompanying drawings, wherein:

FIG. 1 is a triangular graph showing ranges of relative proportions of three alumina particle-size fractions in certain fired alumina cement compositions embodying the invention and having specified values of modulus of rupture; and FIG. 2 is a rectangular co-ordinate graph illustrating the relation between relative proportions of alumina particle size fractions and modulus of rupture, for certain exemplary alumina cement compositions according to the invention.

In the exemplary embodiments to which the figures relate, the body of particulate alumina is constituted of a ternary mixture of three alumina particle size fractions, herein for convenience designated alumina I, alumina II and alumina III. Of these three fractions, two (viz. alumina I and alumina II) are in the submicron particle size range.

Specifically, alumina I is a very fine colloidal alumina of particle size ranging between 0.01 and 0.04 micron. This material has a surface area of 50 to 100 square meters per gram, as determined by the procedures described by S. Brunauer, P. H. Emmett, and E. Teller, in an article entitled "Adsorption of Gases in Multi-Molecular Layers," 16 J. Am. Chem. Soc'y 309–319 (1938). An example of this colloidal material is the product commercially available from Cabot Carbon Corporation under the name of "Alon C."

Alumina II is a coarser colloidal alumina in a particle size range between 0.05 micron and 0.2 micron, having a surface area of about 10 square meters per gram, as determined by the procedures referred to above. This alumina II constitutes an important intermediate fraction between the fine colloidal alumina I and the relatively coarse alumina III described below. In the specific examples hereinafter given, the alumina II employed was derived as aluminous fume from the direct thermal reduction of aluminum ore with carbon in an electric furnace. Such product is a finely divided alumina, somewhat agglomerated, within the requisite particle size range.

Alumina III is a finely divided alumina of −325 mesh size, whereof 100% is smaller than 45 microns and about 5% is finer than 2 microns. This fraction constitutes the body of the cement mixture. Aluminas of this particle size range are readily available in a range of bulk densities between about 80 pounds per cubic foot and about 140 pounds per cubic foot. It is preferred for the present aggregate to use ground, high-density aluminas produced by high temperature firing or by fusion, since these aluminas provide strong, sound particles; an example of such material is −325 mesh ground "Tabular" alumina as commercially available from the Aluminum Company of America. Other aluminas can be used, but if their particles are inherently weaker, the resultant cement will be weaker; and if their particles are more porous, greater amounts of the colloidal alumina fractions will be required to achieve the desired results in the composition, than when such high-density aluminas are employed. In other words, the quantities of submicron aluminas required to achieve the desired results in the composition, III constituent of the cement; however, in the following discussion, reference will be made to the preferred ground high-density aluminas as constituting the alumina III fraction.

A high-purity alumina refractory cement exemplifying the compositions of the present invention may be prepared by mixing with a body of alumina particles containing the several fractions described above, a suitable proportion of an aqueous solution of aluminum chloride, e.g. a nominally saturated solution containing approximately 35% AlCl$_3$ and having a specific gravity of 1.33, as particularly exemplified by a commercial 32° Baumé solution containing approximately 34% by weight aluminum chloride. Such solution yields water-soluble alumina in an amount of 166 grams per liter, i.e. 13% by weight, on pyrolysis. This solution may be mixed with the aforementioned body of alumina particles in a proportion of e.g. between about 20 and about 25 parts by weight aluminum chloride solution to 100 parts by weight alumina.

The relative proportions of alumina I, alumina II, and alumina III included in the cement are selected with reference to the bonding strength desired for the fired cement. A preferred range for such relative proportions is graphically expressed in FIG. 1, which illustrates the modulus of rupture of various cement compositions having various different relative proportions by weight of the alumina particle size fractions I, II, and III. In FIG. 1, the left-hand vertex of the triangular graph represents a body of particles containing 80% alumina III and 20% alumina I; the apex of the graph represents a body of particles containing 100% alumina III; and the right-hand vertex of the graph represents a body of particles containing 80% alumina III and 20% alumina II.

The values of rupture modulus indicated on the graph are as determined for cement compositions comprising a body of particles of alumina I, alumina II, and alumina III, with an aluminum chloride solution as binder, such solution being of the concentration and in the proportions referred to above, and after firing the cement to a temperature of 700° C. The specific modulus values expressed on the graph were determined empirically with fired elements of the indicated compositions by the following procedure:

Two pieces of HWC dense brick each cut to about 1 inch by 1½ inches by 2½ inches in dimension were cemented together, between their 1 inch by 1½ inch faces (which were uncut, i.e. as manufactured faces), with the particular cement composition to be tested. The bricks were supported on two parallel bars approximately 3 inches apart and the cement line was loaded, on the 1 inch face, by a third bar positioned intermediate (midway between) the aforementioned parallel bars. Modulus of rupture was calculated from the formula $$R = \frac{3LW}{2bd^2}$$

wherein $R$ = modulus of rupture, p.s.i.;
$L$ = length of span between the two supporting bars, inches;
$W$ = load on the third bar, pounds;
$b$ = breadth of mortar line, inches; and
$d$ = depth of mortar line, inches.

The numerical values set forth on the graph of FIG. 1 represent the particular rupture modulus values thus determined. The outer broken line 10 represents the range of relative proportions of the three alumina fractions in the cement providing cement compositions (in mixture with aluminum chloride solution) which attain a modulus of rupture of at least 700 p.s.i. when fired to a temperature of 700° C. The broken lines 11, 12 respectively define the ranges of such relative proportions providing cements having rupture modulus of 900 and 1100 p.s.i. under such conditions.

As thus indicated in FIG. 1, for the specified binder and firing temperature, a cement composition attaining a bonding strength corresponding to a rupture modulus value of at least about 700 p.s.i. is provided by a body of particulate alumina which consists essentially of alumina I, alumina II, and alumina III, in the following approximate proportions: alumina I, about 2% to about 8% by weight; alumina II, about 3% to about 12%; and alumina III, about 83% to about 93%. These values constitute a preferred range of relative proportions of the specified alumina particle fractions for cement compositions prepared in accordance with the present invention and containing the same.

With such compositions, incorporating a solution of aluminum chloride as a binder, and including a body of alumina particles consisting of alumina I, alumina II, and alumina III in the preferred range of relative proportions thus indicated, very high bonding strengths are achieved at remarkably low temperatures. These cements are found to develop appreciable strength upon air drying and essentially full strength on heating to about 200° C. In addition, when these cements are fired to about 1250° C., further strength is developed by the formation of a ceramic bond. At the same time, the fired cement has a composition which is more than 99% alumina, since the aluminum chloride binder solution decomposes on firing to yield alumina and volatile compounds (water and hydrochloric acid). The 1250° temperature required for development of a ceramic bond is unusually low for a material comprising alumina of such purity.

The values of relative proportions of aluminas I, II, and III in the above-described cements which constitute the preferred range of proportionate composition are given as determined by rupture modulus values for a composition including an aluminum chloride binder. It is found that the magnitude of rupture modulus values attained with a particular proportionate composition of the body of alumina particles is dependent to some extent on the character of the binder employed, and thus the values given in the graph may vary when salts other than aluminum chloride are used as the binder. Nevertheless, the range of preferred values for relative proportions of alumina I, alumina II, and alumina III remain the same whatever binder is employed; i.e. these preferred values are as indicated above, regardless of the binder used, such ranges providing the optimum bonding strengths attainable with any given binder (although the magnitude of such optimum strengths varies with the particular binder employed).

Stated generally, a broad preferred range of relative proportions of the aforementioned alumina particle constituents, found to provide significantly improved bonding strength, is as follows:

Alumina I, about 2% to about 8%;
Alumina II, about 3% to about 20%; and
Alumina III, about 75% to about 93%, in an aggregate consisting essentially to these three particle fractions, with an aqueous solution of an aluminum salt as a binder.

In further illustration of relationship between submicron alumina content and bonding strength, in the cement compositions of the present invention, reference may be had to FIG. 2, wherein modulus of rupture (attained at a firing temperature of 700° C.) is plotted against total submicron alumina content, for cements consisting of ternary mixtures of the abovedescribed aluminas I, II, and III with an aluminum chloride binder. Although the values plotted in FIG. 2 are representative of results with certain preferred ternary mixtures, in that the submicron particles are partly alumina I and partly alumina II, nevertheless the graph illustrates the fact that improvement is achieved by the underlying concept of including at least a small quantity of submicron alumina along with a larger quantity of alumina in a particle size range of −325 mesh but extending substantially no lower than about 1 micron. In other specific mixtures involving both submicron particles and other particles within the general range just indicated, the plotted line may not rise as steeply and may even exhibit a downward position, but nevertheless demonstrates a significant improvement in modulus of rupture of the completed (fired) product as against alumina cements containing no submicron alumina.

To provide additional strength for cement compositions incorporating such body of alumina particles and an aluminum salt binder, there may be included in the body of particles a further fraction of alumina particles in a particle size range generally coarser than that indicated above for alumina III. One example of such further fraction, herein designated alumina IV, is a finely divided alumina in the following particle size range:

−300 microns _____ 95% (by weight).
−100 microns _____ 75%.
−37 microns _____ 40%.
−2 microns _____ Not more than 2%.

As in the case of alumina III, this latter fraction, if included, is desirably constituted of a ground, high-density alumina, produced by high temperature firing or by fusion and exemplified by −60 mesh ground "Tabular" alumina commercially available from the Aluminum Company of America. Aluminas having other physical properties can be used, but, again, if the particles are inherently weaker than such high-density product the resulting cement will be weaker, and if the particles are more porous greater amounts of the fine phases will be required, than when the high-density material is employed as the alumina IV fraction. In general, in cement compositions incorporating alumina IV (or an equivalent relatively coarse particulate alumina as an ingredient) the alumina particles smaller than 325 mesh are preferably present in such proportion as to constitute at least about 25% of the total particulate mass.

A further addition of still coarser alumina, e.g. a fraction of particle size ranging upwardly from about 60 mesh size, may be included to provide additional strength for the composition for certain purposes, e.g. to provide a castable refractory. Again, this material if included is preferably of high density, e.g. of the same general type as aluminas III and IV, for the reasons set forth above.

While specific preferred ranges of relative proportions of aluminas I, II, and III have been indicated above, i.e. for ternary mixtures of these three fractions, together with a convenient range of proportions of binder solution, in a more general sense the relative proportions of constituents incorporated in the compositions of the present invention are selected with regard to the effect of such proportions on the bonding strength of the resultant compositions, i.e. to provide a composition of desirably high bonding strength. Thus, if excessive binder solution is included, the resultant cement is thin and will be weak after firing. On the other hand, if too little solution is used, the cement is harsh and dry and is weak when fired because it contains insufficient subcolloidal alumina (i.e. produced by pyrolysis of the salt) properly to fill the interstices between coarser particles. If excessive alumina I is used, there is excessive shrinkage on drying and the mortar cracks; when fired, it is hard but weak. If too little alumina I is used the mortar is weak. As to the coarser additive represented by alumina IV or alumina of still larger particle size, if too much of such coarse alumina is added it creates interstices between its own particles too large to be filled by the plastic phase represented by the binder and aluminas I, II, and III, with the result that the mortar will be porous and weak. On the other hand, if insufficient coarse alumina is used, it will not contribute effectively to the strength of the mortar.

The several features and advantages of the invention are further illustrated in the following specific examples, wherein reference is made to alumina particle size fractions I, II, III and IV as defined above (all proportions indicated in the examples being by weight, and each rupture modulus value set forth in Examples II–IV representing the average of several tests):

Example I

An alumina cement mixture was prepared by successively adding 7 parts by weight alumina I, 12 parts alumina II, 81 parts alumina III, and 60 parts alumina IV to 32 parts of aluminum chloride solution of 35% concentration. This mixture, upon firing, was found to have an alumina content above 99%. The bonding strength attained by this composition at various firing temperatures is indicated in the following table, with rupture modulus values determined by the procedure previously set forth:

| Firing temperature: | Modulus of rupture (p.s.i.) |
|---|---|
| Air dried at room temperature | 275 |
| 100° C. | 500 |
| 400° C. | 1200 |
| 700° C. | 900 |
| 1000° C. | 1000 |
| 1100° C. | 1200 |
| 1250° C. | 1000 |
| 1300° C. | 1100+ |

Example II

A first composition, designated A, was prepared by successively adding 4.2 parts of alumina I, 11.1 parts of alumina II, 47.2 parts of alumina III, and 37.5 parts of alumina IV to 22.2 parts of aluminum chloride solution (32° Baumé, approximately 34% by weight aluminum chloride, yielding 166 grams per liter or 13% by weight water soluble alumina). For purposes of comparison, a second composition, designated B, was prepared containing no alumina I or II, 57 parts of alumina III, 43 parts of alumina IV, and 25.7 parts of the same aluminum chloride solution. For further comparison, a cement composition designated C was prepared containing 75 parts of divided alumina of −150 mesh size and 25 parts of so-called alumina slip, i.e. finely divided alumina of −300 mesh size, admixed with 24 parts of the same aluminum chloride solution, but containing no more than negligible amounts of alumina of submicron particle size.

Each of these compositions was fired to a temperature of 700° C. and tested for modulus of rupture by the above-described procedure. The results are summarized in the following table:

| Composition: | Modulus of rupture (p.s.i.) |
|---|---|
| A | 920 |
| B | 100 |
| C | 280 |

As the foregoing table demonstrates, the composition A prepared according to the present invention achieved a fired bonding strength several times higher than either of the comparative compositions B and C which contained essentially no submicron size alumina.

Example III

A cement, herein designated composition D, was prepared by successively adding 4.2 parts of alumina I, 11.1 parts of alumina II, 47.2 parts of alumina III, and 37.5 parts of alumina IV, to a mixture of 6.3 parts of water and 15 parts of commercial aluminum chlorohydrate solution. The latter solution, which had a concentration of about 50% $Al(OH)_5Cl$, analyzed 198 grams Al per liter and 111 grams Cl per liter, with a density of 1.33 grams per milliliter (whence the formula would be $$Al_2(OH)_{5.15}Cl_{0.85}$$

and solids would be approximately 625 grams per liter), yielding about 374 grams per liter or 28% by weight water-soluble alumina.

For purposes of comparison, a composition (herein designated E) was prepared containing 25 parts of alumina slip, 75 parts of −150 mesh alumina (as defined in Example II above), 12 parts of water, and 5 parts of commercial solid aluminum chlorohydrate.

The bonding strengths of these two compositions as fired to 700° C., ascertained by the rupture modulus testing procedure set forth above, are compared in the following table:

| Compositions: | Modulus of rupture (p.s.i.) |
|---|---|
| D | 880 |
| E | 250 |

Again, the composition D prepared in accordance with the present invention greatly exceeded in strength the composition containing no submicron alumina.

Example IV

To determine the relative effectiveness of various binder salt solutions with the particulate alumina bodies of the present invention, a cement composition F was prepared by successively adding 4.2 parts of alumina I, 11.1 parts of alumina II, 47.2 parts of alumina III, and 37.5 parts of alumina IV to 23.8 parts of aluminum sulfate solution having a density of 1.31 grams per milliliter and yielding approximately 17% water soluble alumina. A second composition, designated G, was prepared containing 57 parts of alumina III, 43 parts of alumina IV, and 26.3 parts of the same aluminum sulfate solution. Another composition, designated H, was prepared by successively adding 4.2 parts of alumina I, 11.1 parts of alumina II, 47.2 parts of alumina III, and 37.5 parts of alumina IV to 23.8 parts of aluminum nitrate solution prepared by dissolving aluminum nitrate crystals in water to form a nominally saturated solution having a density of 1.34 grams per milliliter. A further composition, designated J, was prepared containing 57 parts of alumina III, 43 parts of alumina IV, and 25.7 parts of the latter aluminum nitrate solution.

Each of these mixtures was fired to a temperature of 700° C., and the modulus of rupture of the fired cement was ascertained by the foregoing procedure. The bonding strength of these cement compositions are indicated in the following table, and are compared with the strengths developed by the compositions A and D as respectively prepared in Examples II and III above.

| Composition | Binder | Modulus of Rupture (p.s.i.) |
|---|---|---|
| F | Aluminum Sulfate | 400 |
| G | do | 53 |
| H | Aluminum Nitrate | 200 |
| J | do | 129 |
| A | Aluminum Chloride | 920 |
| D | Aluminum Chlorohydrate | 880 |

As these results indicate, the presence of submicron alumina in the compositions F and H resulted in significant improvement in bonding strength, as compared to the compositions lacking such particle size fractions, i.e. G and J, with the specified binders. However, as the table further shows, use of an aluminum chloride or chlorohydrate binder with the submicron-containing aggregate (as represented by compositions A and D) yields a very much higher bonding strength than the aluminum nitrate binder, and a substantially higher strength than the sulfate binder (which may be considered intermediate in effectiveness between the nitrate and the chloride and chlorohydrate binders).

*Example V*

The following five bodies of alumina particles were found to provide cements of approximately equal strength with a given binder solution and at a given firing temperature:

| Mixture | Percent −1 Micron Particles | Percent 1–10 Micron Particles | Percent 10–44 Micron Particles |
|---|---|---|---|
| 1 | 37 | 62 | 1 |
| 2 | 29 | 70 | 1 |
| 3 | 20 | 59 | 21 |
| 4 | 13 | 25 | 62 |
| 5 | 20 | 38 | 42 |

In mixtures 1 and 2, the source of 1–44 micron particles was a special material analyzing approximately 98% −10 micron particles, 2% −1 micron particles. In mixture 3, the source of +1 micron particles was a mixture of the latter material and a conventional −325 mesh particulate alumina. The +1 micron alumina in mixture 4 was a conventional −325 mesh material having a packed bulk density of 122 lb./ft.$^3$, and that in mixture 5 was another conventional −325 mesh material having a packed bulk density of 107 lb./ft.$^3$ Each of these cements attained high bonding strength at low firing temperatures.

It is to be understood that the invention is not limited to the features and embodiments hereinabove specifically set forth, but may be carried out in other ways without departure from its spirit.

We claim:

1. A fired refractory cement consisting essentially of a mixture of −325 mesh size alumina particles whereof a minor fraction constituting at least about 2% of said mixture are particles smaller than 1 micron and the remainder are particles larger than about 1 micron; and as a binder for said mixture of aluminum particles, the residue produced upon firing of an aqueous solution of an aluminum salt selected from the class consisting of aluminum chloride, aluminum chlorohydrate, aluminum sulfate, aluminum nitrate, and aluminum phosphate, said binder being present in a proportion effective to hold the mixture together as a strong integral mass.

2. A fired refractory cement consisting essentially of a mixture of −65 mesh size alumina particles including a content of −325 mesh size particles whereof a minor fraction constituting at least about 2% of said −325 mesh size particles and at least about 1% of said mixture are particles smaller than 1 micron and the remainder are particles larger than about 1 micron; and as a binder for said mixture of alumina particles, the residue produced upon firing of an aqueous solution of an aluminum salt selected from the class consisting of aluminum chloride, aluminum chlorohydrate, aluminum sulfate, aluminum nitrate, and auminum phosphate, said binder being present in a proportion effective to hold the mixture together as a strong integral mass.

3. A fired refractory cement consisting essentially of a mixture of −65 mesh size alumina particles including a content of −325 mesh size particles whereof a first fraction are particles smaller than 0.05 micron, a second fraction are particles larger than said first fraction but smaller than 1 micron, and the remainder constituting a major proportion of said content are particles larger than about 1 micron, said first and second fractions together constituting at least about 2% of said content and at least about 1% of said mixture; and as a binder for said mixture of alumina particles, the residue produced upon firing of an aqueous solution of an aluminum salt selected from the class consisting of aluminum chloride, aluminum chlorohydrate, aluminum sulfate, aluminum nitrate, and aluminum phosphate, said binder being present in a proportion effective to hold the mixture together as a strong integral mass.

4. A fired refractory cement consisting essentially of a mixture of −65 mesh size alumina particles including a content of −325 mesh size particles whereof a first fraction are particles in a size range between about 0.01 micron and about 0.04 micron, a second fraction are particles in a size range between about 0.05 micron and about 0.2 micron, and the remainder constituting a major proportion of said content are particles larger than about 1 micron, said first and second fractions together constituting at least about 2% of said content and at least about 1% of said mixture, and said content constituting at least about 25% of said mixture; and as a binder for said mixture of alumina particles, the residue produced upon firing of an aqueous solution of an aluminum salt selected from the class consisting of aluminum chloride, aluminum chlorohydrate, aluminum sulfate, aluminum nitrate, and aluminum phosphate, said binder being present in a proportion effective to hold the mixture together as a strong integral mass.

5. A fired refractory cement consisting essentially of a mixture of −65 mesh size alumina particles including a content of −325 mesh size particles whereof a minor fraction constituting at least about 2% of said content and at least about 1% of said mixture are particles smaller than 1 micron and the remainder are particles larger than about 1 micron; and an alumina binder, for said mixture of alumina particles, produced by pyrolysis of an aqueous solution of an aluminum salt that decomposes upon firing to yield alumina and volatile compounds, said binder being present in a proportion effective to hold the mixture together as a strong integral mass.

6. A fired refractory cement consisting essentially of a mixture of −65 mesh size alumina particles including a content of −325 mesh size particles whereof a first fraction are particles in a size range between about 0.01 micron and about 0.04 micron, a second fraction are particles in a size range between about 0.05 micron and 0.2 micron, and the remainder constituting a major proportion of said content are particles larger than about 1 micron, said first and second fractions together constituting between about 5% and about 40% of said content, and said content constituting at least about 25% of said mixture; and an alumina binder for said body of alumina particles, produced by pyrolysis of an aqueous solution of an aluminum salt that decomposes upon firing to yield alumina and volatile compounds, said binder being present in a proportion effective to hold the mixture together as a strong integral mass.

7. A refractory cement composition consisting essentially of a mixture of −65 mesh size alumina particles including a content of −325 mesh size alumina particles whereof a minor fraction constituting at least about 2% of said content and at least about 1% of said mixture are particles smaller than 1 micron and the remainder are particles larger than about 1 micron; and as a binder for said mixture of alumina particles, an aqueous solution of an aluminum salt that decomposes upon firing to yield alumina and volatile compounds, said binder being present in a proportion effective to hold the mixture together as a strong integral mass upon firing of said cement composition.

8. A refractory cement composition consisting essentially of a mixture of −65 mesh size alumina particles including a content of −325 mesh size alumina particles whereof a minor fraction constituting between about 5% and about 40% of said content and at least about 1% of said mixture are particles smaller than 1 micron, and the remainder are particles larger than about 1 micron; and, as a binder for said body of alumina particles, an aqueous solution of an aluminum salt that decomposes upon firing to yield alumina and volatile compounds, said binder being present in a proportion effective to hold the mixture together as a strong integral mass upon firing of said cement composition.

9. A refractory cement composition consisting essentially of a mixture of —65 mesh size alumina particles including a content of —325 mesh size particles whereof a first fraction are particles smaller than 0.05 micron, a second fraction are particles larger than said first fraction but not larger than about 0.2 micron, and the remainder constituting a major proportion of said content are particles larger than about 1 micron, said first and second fractions together constituting at least about 2% of said content and at least about 1% of said mixture, and said content constituting at least about 25% of said mixture; and as a binder for said mixture of alumina particles, an aqueous solution of an aluminum salt selected from the class consisting of aluminum chloride, aluminum chlorohydrate, aluminum sulfate, aluminum nitrate, and aluminum phosphate, said binder being present in a proportion effective to hold the mixture together as a strong integral mass upon firing of said cement composition.

10. A refractory cement composition consisting essentially of a mixture of —65 mesh size alumina particles including a content of —325 mesh size particles whereof a first fraction are particles in a size range between about 0.01 micron and about 0.04 micron, a second fraction are particles in a size range between about 0.05 micron and about 0.2 micron, and the remainder are particles larger than about 1 micron, said first and second fractions together constituting between about 5% and about 40% of said —325 mesh size particles and at least about 1% of said mixture and said particles larger than about 1 micron constituting a major proportion of said —325 mesh size particles; and as a binder for said mixture of alumina particles, an aqueous solution of an aluminum salt selected from the class consisting of aluminum chloride, aluminum chlorohydrate, aluminum sulfate, aluminum nitrate, and aluminum phosphate, said binder being present in a proportion effective to hold the mixture together as a strong integral mass upon firing of said cement composition.

11. An alumina cement composition consisting essentially of an aqueous solution of an aluminum salt that decomposes upon firing to yield volatile compounds and alumina, as a binder, and a mixture of —65 mesh size alumina particles including a content of —325 mesh size particles consisting essentially of about 2% to about 8% alumina particles in a size range between about 0.01 micron and about 0.04 micron, about 3% to about 20% alumina particles in a size range between about 0.05 micron and about 0.2 micron, and about 75% to about 93% high-bulk-density —325 mesh size alumina particles larger than about 1 micron, said binder being present in a proportion effective to hold the mixture together as a strong integral mass upon firing of said cement composition.

12. A mixture as defined in claim 9, wherein said salt is aluminum chloride.

13. A mixture as defined in claim 9, wherein said salt is aluminum chlorohydrate.

14. An alumina cement composition consisting essentially of an aqueous solution of an aluminum salt that decomposes upon firing to yield volatile compounds and alumina, as a binder, a first fraction of alumina particles in a size range between about 0.01 micron and about 0.04 micron, a second fraction of alumina particles in a size range between about 0.05 micron and about 0.2 micron, and a third fraction of high-bulk-density —325 mesh size alumina particles larger than about 1 micron, said first, second, and third fractions being present in relative proportions falling within the area enclosed by line 10 of FIGURE 1 of the drawings, said binder being present in a proportion effective to hold the mixture together as a strong integral mass upon firing of said cement composition.

15. In procedure for preparing a fired alumina cement, the steps of establishing an alumina cement composition, including mixing, with an aqueous solution of an aluminum salt selected from the class consisting of aluminum chloride, aluminum chlorohydrate, aluminum sulfate, aluminum nitrate, and aluminum phosphate, as a binder, alumina particles smaller than 1 micron and —65 mesh size alumina particles, including —325 mesh size particles, larger than about 1 micron, to provide a mixture of alumina particles consisting essentially of —65 mesh size particles including a content of —325 mesh size particles whereof a minor fraction constituting at least about 2% of said content and at least about 1% of said mixture are particles smaller than 1 micron and the remainder are particles larger than about 1 micron; and heating said composition to fire said cement; said binder being present in a proportion effective to hold the mixture together as a strong integral mass upon heating of said composition as aforesaid.

16. In procedure for preparing a fired alumina cement, the steps of establishing an alumina cement composition, including mixing, with an aqueous solution of an aluminum salt that decomposes upon firing to yield alumina as a binder and volatile compounds, alumina particles smaller than 1 micron and —65 mesh size alumina particles, including —325 mesh size particles, larger than about 1 micron, to provide a mixture of alumina particles consisting essentially of —65 mesh size particles including a content of —325 mesh size particles whereof a minor fraction constituting at least about 2% of said content and at least about 1% of said mixture are particles smaller than 1 micron and the remainder are particles larger than about 1 micron; and heating said composition to decompose said salt into alumina and said volatile compounds; said binder being present in a proportion effective to hold the mixture together as a strong integral mass upon heating of said composition as aforesaid.

17. In a procedure for preparing a fired alumina cement, the steps of establishing a cement composition, including successively adding, to an aqueous solution of an aluminum salt that decomposes upon firing to yield alumina as a binder and volatile compounds, alumina particles smaller than 1 micron and —65 mesh size alumina particles, including —325 mesh size particles, larger than about 1 micron, in relative proportions providing a mixture of alumina particles consisting essentially of —65 mesh size particles including a content of —325 mesh size particles whereof a minor fraction constituting between about 5% and about 40% of said content and at least about 1% of said mixture are particles smaller than 1 micron and the remainder are particles larger than about 1 micron; and heating said composition to decompose said salt into alumina and said volatile compounds, said binder being present in a proportion effective to hold the mixture together as a strong integral mass upon heating of said composition as aforesaid.

18. In procedure for preparing a fired alumina cement, the steps of establishing a cement composition, including mixing, with an aqueous solution of an aluminum salt that decomposes upon firing to yield alumina as a binder and volatile compounds, alumina particles smaller than 1 micron and —65 mesh size alumina particles, including —325 mesh size particles, larger than about 1 micron, to provide a mixture of alumina particles consisting essentially of —65 mesh size particles including a content of —325 mesh size particles whereof a minor fraction constituting between about 10% and about 40% of said content are particles smaller than 1 micron and the remainder are particles larger than about 1 micron, said content constituting at least about 25% of said mixture; and heating said composition to decompose said salt into alumina and said volatile compounds, said binder being present in a proportion effective to hold the mixture together as a strong integral mass upon heating of said composition as aforesaid.

19. In a procedure for preparing a fired alumina cement, the steps of establishing a cement composition, including mixing with an aqueous solution of an aluminum salt selected from the class consisting of aluminum chloride, aluminum chlorohydrate, aluminum sulfate, aluminum nitrate and aluminum phosphate as a binder alumina particles smaller than 1 micron and —65 mesh size alumina particles, including —325 mesh size alumina particles, larger than about 1 micron, to provide a mixture of alumina particles consisting essentially of —65 mesh size particles including a content of —325 mesh size particles whereof a minor fraction constituting between about 5% and about 40% of said content and at least about 1% of said mixture are particles smaller than 1 micron and the remainder are particles larger than about 1 micron; and heating said composition to fire said cement; said binder being present in a proportion effective to hold the mixture together as a strong integral mass upon heating of said composition as aforesaid.

20. In procedure for preparing a fired alumina cement, the steps of establishing an alumina cement composition, including successively adding to an aqueous solution of an aluminum salt that decomposes upon firing to yield alumina as a binder and volatile compounds, a first fraction of alumina particles in a size range between about 0.01 micron and about 0.04 micron, a second fraction of alumina particles in a size range between about 0.05 micron and about 0.2 micron, and a third fraction of high-bulk-density —325 mesh size alumina particles larger than about 1 micron, to provide a mixture of alumina particles consisting essentially of about 2% to about 8% of said first fraction, about 3% to about 20% of said second fraction and about 75% to about 93% of said third fraction; and heating said composition to decompose said salt into alumina and said volatile compounds, said binder being present in a proportion effective to hold the mixture together as a strong integral mass upon heating of said composition as aforesaid

References Cited by the Examiner
UNITED STATES PATENTS

| | | | |
|---|---|---|---|
| 2,297,169 | 9/1942 | Ross | 106—65 |
| 2,818,345 | 12/1957 | Vickers | 106—65 |

References Cited by the Applicant
UNITED STATES PATENTS 3,067,050  12/1962  Miller.

TOBIAS E. LEVOW, *Primary Examiner.*

J. POER, *Assistant Examiner.*

UNITED STATES PATENT OFFICE
CERTIFICATE OF CORRECTION

Patent No. 3,274,008 September 20, 1966

Victor A. Braunwarth et al.

It is hereby certified that error appears in the above numbered patent requiring correction and that the said Letters Patent should read as corrected below.

Column 1, line 41, for "strentgh" read -- strength --; column 2, line 24, for "above" read -- about --; column 6, line 11, strike out "to achieve the desired results in the composition," and insert instead -- are dependent on the bulk density of the alumina --; line 54, for "elements" read -- cements --; column 7, line 68, for "essentially to" read -- essentially of --; column 8, line 14, for "position" read -- portion --.

Signed and sealed this 1st day of August 1967.

(SEAL)
Attest:

EDWARD M.FLETCHER,JR.　　　　　　　　　　　EDWARD J. BRENNER
Attesting Officer　　　　　　　　　　　　　　Commissioner of Patents